United States Patent [19]

Pazzaglia

[11] Patent Number: 4,956,536
[45] Date of Patent: Sep. 11, 1990

[54] DEVICE FOR PRE-CALIBRATING HOLLOW CYLINDRICAL BODIES IN SEAM WELDING MACHINES

[75] Inventor: Luigi Pazzaglia, Bologna, Italy

[73] Assignee: Cefin S.p.A., Bologna, Italy

[21] Appl. No.: 389,957

[22] Filed: Aug. 7, 1989

[30] Foreign Application Priority Data

Nov. 30, 1988 [IT] Italy .................................. 3682 A/88

[51] Int. Cl.⁵ .............................................. B23K 11/36
[52] U.S. Cl. ...................................................... 219/64
[58] Field of Search ............................................ 219/64

[56] References Cited

U.S. PATENT DOCUMENTS 3,834,010 9/1974 Wolfe et al. ............................ 219/64

Primary Examiner—Clifford C. Shaw
Attorney, Agent, or Firm—Banner, Birch, McKie & Beckett

[57] ABSTRACT

Tin cans are pre-calibrated prior to entering between the electrode rollers of an automatic seam welder, by a device installed immediately upline of the final calibration and weld station; such a device comprises one or more sets of rollers, each set aligned transversely so as to describe an internal circumference encompassing the can, and at least one such set comprises cylindrical rollers occupying positions that are fixed radially in relation to the cans passing through.

20 Claims, 2 Drawing Sheets

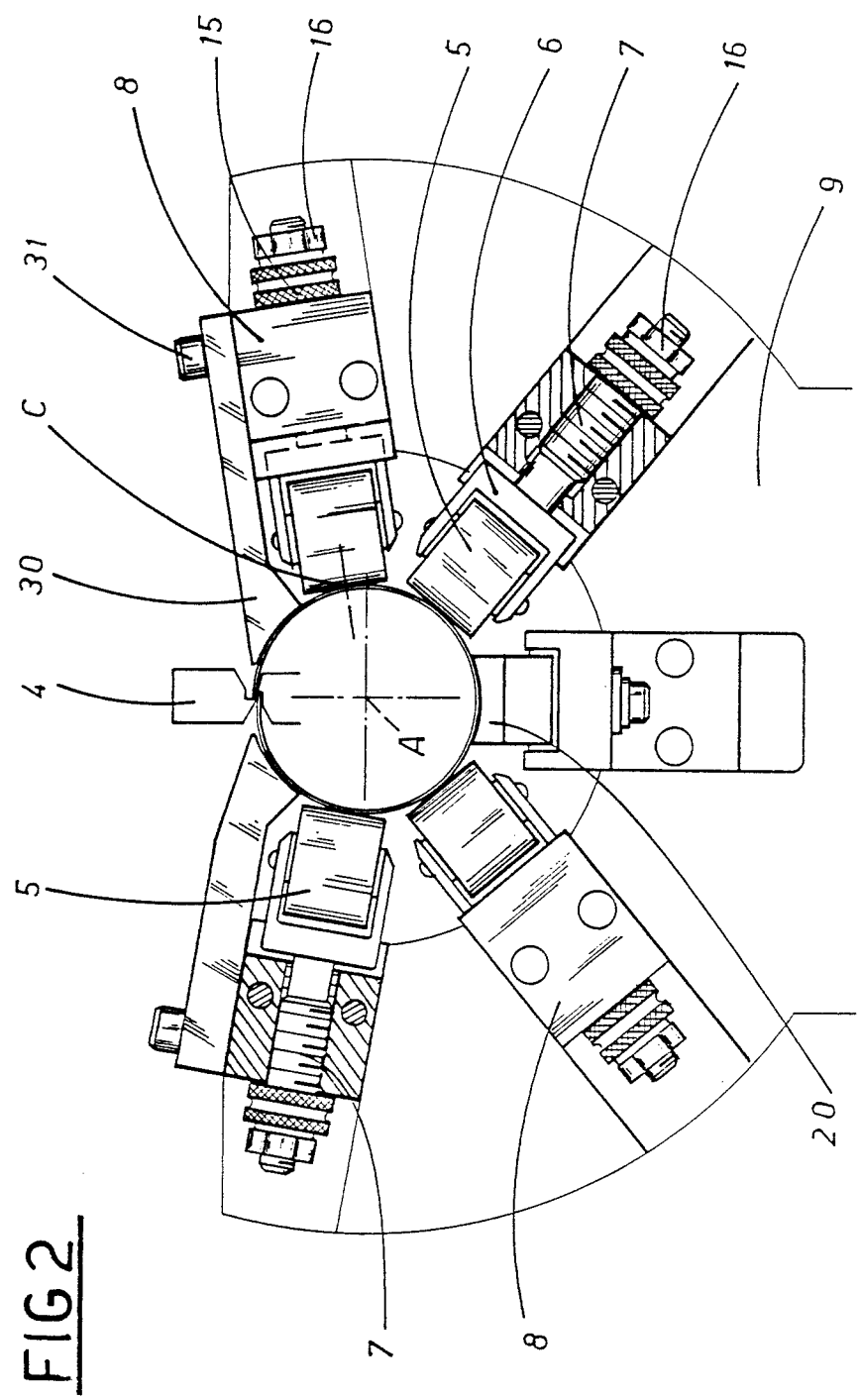

DEVICE FOR PRE-CALIBRATING HOLLOW CYLINDRICAL BODIES IN SEAM WELDING MACHINES

BACKGROUND OF THE INVENTION

The present invention relates to a device for use in conjunction with continuous welding machines, by means of which to pre-calibrate hollow cylindrical bodies in readiness for seam welding.

The prime requirement in such machines is that of positioning the rolled sheet of material during its progress toward the weld station, in such a way as to obtain a shape as near cylindrical as possible, and a feed as continuous and regular as possible. Such a requirement is of fundamental importance in welding machines of the type in question, as even a slight variation in the position of the two edges of the sheet lapped for joining can leas to a defective weldment, as also can an irregular feed action.

In the particular instance of seam welding machines for hollow cylindrical objects, and in particular tin cans, the sheet of metal destined to form the cylindrical wall of the can is fed toward the weld along a horizontal arm. During its passage along the arm, the rolled-up sheet is directed first through a pre-calibration device, and thereafter through a final calibration device at which contact is made with two electrode rollers, positioned internally and externally of the hollow body, respectively; it is these rollers that effect the weld.

The pre-calibration device comprises a plurality of sets of profiled rollers or roller stations, ranged around successive parallel circumferences. This device is followed, along the feed direction, by a further set of rollers constituting the calibration device proper, which consist in calibrated wheels describing an internal circumference of diameter identical to that of the size of a can; the rollers of the pre-calibration station are shaped in such a way as to match the curvature of the hollow body, and carried in spring-loaded clevis-type supports anchored to the main structure of the machine. The prior art also teaches the use of a Z-section guide positioned longitudinally in relation to the can, above the pre-calibration and calibration devices, which affords opposed profiles converging onto the weld, against which the lapped edges of the sheet of metal locate during pre-calibration. Thus, on arrival at the weld rollers, the can body is completely encompassed and held firmly against the profiles of the 'Z' by the pressure of the pre-calibration rollers, which is applied radially and counteracts the tendency of the rolled sheet to spread.

One of the limitations of such a system consists precisely in the structural embodiment outlined, and more exactly, in the spring-loaded connection between the single roller and the machine frame. The springs are required to withstand dynamic distortions occurring in a particularly short space of time, given the fast tempo at which welding is performed, and thus operate in notably critical conditions; moreover, the device as a whole is complicated and costly.

Furthermore, can bodies which exhibit dimensional defects may jam on encountering the spring-loaded rollers at high speed, with the result that the leading edge can deform on entering between the electrodes. Another serious drawback stems from the risk of jamming to which the spring rollers are subject; this is caused by dust (tin, in most cases) that falls on the clevis supports and will accumulate unless frequently cleaned. In addition, the spring rollers require a complex and laborious adjustment procedure in order to select the radial pressure transmitted to the can.

In view of the foregoing, the object of the present invention is to embody a pre-calibration device that will permit of guiding can bodies for welding and controlling their dimensions, even at high rates of production (e.g. 60 meters/min and more), and which is simpler to construct and control and offers greater dependability than prior art types.

SUMMARY OF THE INVENTION

The stated object is achieved in a pre-calibration device for hollow cylindrical bodies according to the invention, which is intended for installation immediately preceding the calibration rollers of a continuously operating seam welder. Such a device consists in a plurality of sets of profiled rollers aligned in planes disposed perpendicular to the feed direction of the can body, wherein at least one such set of rollers consists in a plurality of rollers each exhibiting a radius of curvature greater than that of the encompassed can body and set in fixed position in relation thereto, in such a way that one point of rolling frictional contact only is created between metal and roller during the passage of the can body.

BRIEF DESCRIPTION OF THE DRAWINGS

The invention will now be described in detail, by way of example, with the aid of the accompanying drawings, in which:

FIG. 2 is a diametral section through an individual station of the pre-calibration device.

DESCRIPTION OF THE PREFERRED EMBODIMENTS

Figure 1:
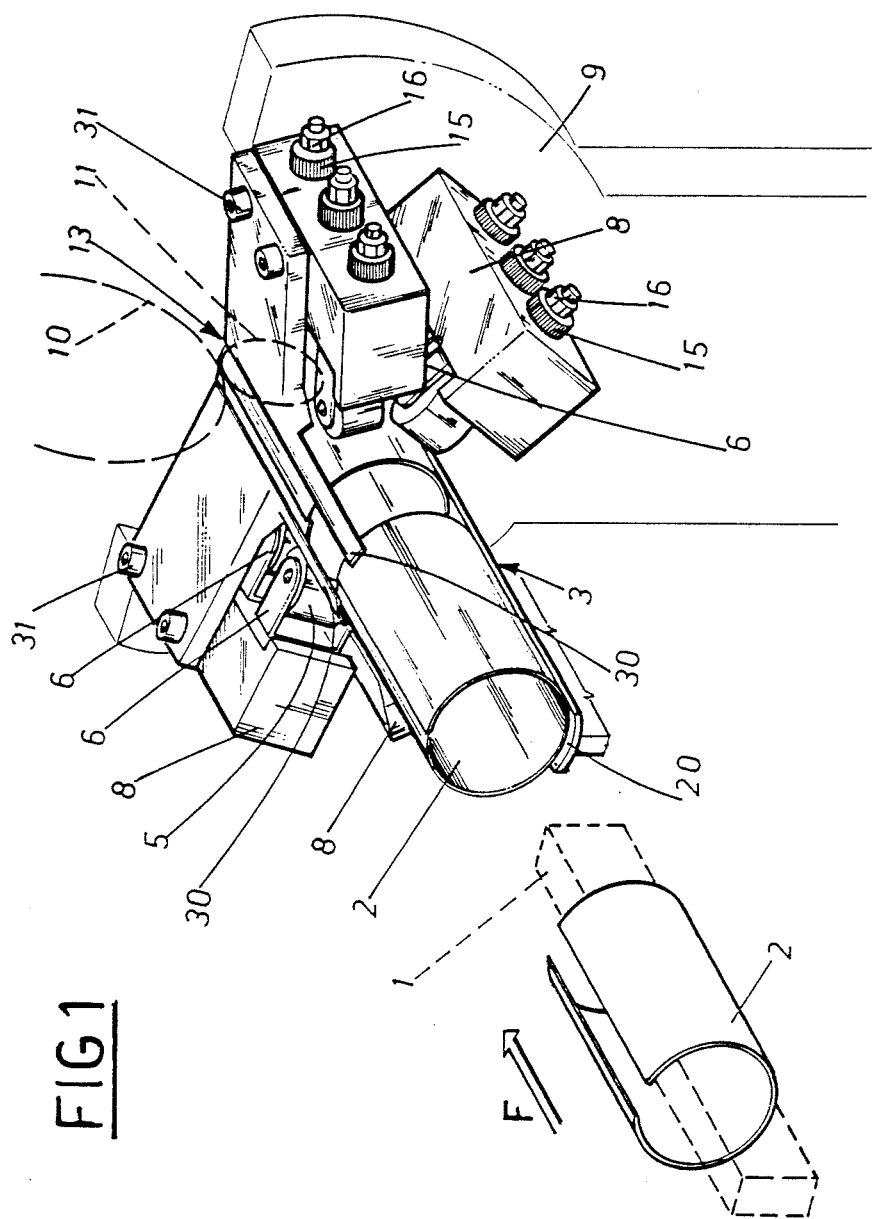
FIG. 1 is a perspective, viewed from the rear with certain parts omitted better to reveal others, which provides a frontal illustration of the main components of the pre-calibration device disclosed, installed at a station preceding the weld rollers.

FIG. 1 shows the part of a welding machine located immediately preceding the final calibration and weld station.

The machine in question is of the type comprising in a horizontal arm, illustrated schematically and denoted 1, along which the can bodies are made to advance singly and in succession in the direction arrowed F by conventional conveying means which are not illustrated. The can bodies 2 are rolled up into cylindrical shape, in such a way that the two longitudinal edges approach and overlap partly, then directed forward in alignment with one another by a guide 4 of 'Z' section, the profiles of which maintain the two edges faultlessly parallel, and fed ultimately into a pair of seam weld rollers 10 and 11 (shown schematically in FIG. 1) which are connected electrically to the poles of a welding current generator.

Proceeding gradually toward the rollers 10 and 11, the single can bodies 2 are supported and guided initially by the horizontal arm 1, then directed first into a pre-calibration device 3, and thereafter through a final calibration device 13, positioned substantially together with, and more exactly, immediately preceding the weld rollers 10 and 11. The pre-calibration device 3 consists essentially in a plurality of sets of rollers located preceding the weld rollers 10 and 11, each set comprising a plurality of rollers the surfaces of which define an internal circumference. The resulting succession of internal circumferences will be substantially of diameter such as to ensure that the longitudinal edges of the rolled body 2 locate stably against the parallel profiles of the Z-section guide during the passage of the body toward the weld station.

Thus, before reaching the weld rollers 10 and 11, the freely-projecting lapped edges of the can body are brought into contact with the corresponding profiles of the Z-guide 4, the embodiment of which determines the exact width of the welded overlap. The embodiment of a device according to the present invention, at least when consisting in a station comprising a number of rollers occupying a plane disposed diametrically in relation to the can body, is such that the surface of at least one roller, denoted 5 in FIG. 2, and more precisely, of the transverse generator in contact with the can body, exhibits a radius of curvature at least greater than that of the cylindrical body or possibly a radius of curvature that is infinite or convex. Contact should not extend extensively through an arc, but should be limited to a small area, and possibly a single point C. In a preferred embodiment, the rollers 5 will be cylindrical as in FIG. 2, such that the area of contact can be restricted thus to a single point, and each roller 5 freely rotatable about its own diametral axis while permanently associated with a clevis 6, of which the shank or shaft 7 is connected rigidly to a support 8 fixed to the main structure 9 of the machine.

Likewise in a preferred embodiment, the shaft 7 supporting each roller 5 will be adjustable in the radial direction so as to permit shifting the roller 5 nearer to or farther from the axis A of the can body, depending upon the dimensions of the body itself. The adjustment is effected by way of a knob 15, micrometric screw and locknut 16.

Accordingly, the single roller 5 does not oscillate radially during passage of the can body 2.

Still referring to FIG. 2, the pre-calibration device further comprises a bottom rest 20 (which in practice may replace one row of rollers) consisting preferably of a bar the top surface of which is either profiled to match the can body, or flat, or convex, and extends longitudinally beyond the pre-calibration station. Similarly, at the top, one has two guides 30 connected to the main structure 9 by way of relative fasteners 31; the profile of these guides 30 is shown as an arc to a circle matching that of the can body 2 to be supported, though here again the flat or convex profile might be adopted. Instead of providing points of contact C as in the case of the cylindrical rollers, which engage the metal in rolling friction, the bottom bar 20 and the top guides 30 afford three linear, longitudinal sectors engaged by the cylindrical body in sliding friction. The dimensions of the top guides 30 might be such as to envelop the cylindrical body as far as possible across the area nearest to the Z-guide, in order to provide efficient support at the most delicate area, i.e. alongside the lapped edges.

The pre-calibration device according to the present invention supports and guides a can body during its formation, making contact through circumferences in planes perpendicular to the feed direction of the can body, though instead of making contact through the entire circumference, utilizing spring loaded elements as taught by the prior art, contact is made through discrete points set apart one from the other, and utilizing no springs. Accordingly, any pre-calibration departure of the can bodies from prescribed nominal dimensions can be compensated by the elastic properties of the can body itself, which is highly flexible and thus able to deform (albeit such deformation will be minimal) by virtue of the fact that contact with the rollers 5 is limited to discrete points C, and the edges of the sheet can thus be maintained parallel, in contact with the profiles of the Z-section guide 4.

The pre-calibrating device disclosed permits of taking up any dimensional variations in the rolled can body sheets, while remaining unaffected by variations in the rate at which the sheets are fed through the machine; thus it is that the can bodies are directed forward faultlessly through the sets of calibration rollers, and ultimately between the weld rollers 10 and 11.

What is claimed:

1. A device for precalibrating hollow cylindrical can bodies to be seam-welded by continuously operating machines comprising:
    an arm, by and along which rolled can bodies are supported and advanced while assuming cylindrical form, their two longitudinal edges approaching one another and overlapping;
    a calibration station at which the forming can body assumes prescribed dimensions and is welded by a pair of electrode rollers located internally and externally of the body, respectively;
    a precalibration device, located preceding the calibration station along the feed direction followed by the can bodies, consisting in one or more sets of rollers arranged around a circumference coaxial with and of diameter substantially equal to that of the can body, of which at least one set consists in a plurality of rollers occupying fixed positions in relation to the feed direction and exhibiting surfaces with a radius of curvature greater than that of the encompassed cylindrical surface, in such a way that as physically small an area as possible is in rolling frictional contact between each roller and the cylindrical body passing through;
    a guide of Z section located above the calibration rollers and extending parallel with the feed direction to terminate immediately prior to the pair of electrode rollers, with which the as yet unwelded edges of the can body are brought into contact.

2. A device as in claim 1, wherein the precalibration device further comprises a pair of guides located one on each side of the Z-section guide, extending a distance corresponding at least to that occupied by one of the sets of precalibration rollers, rigidly supported by the main structure of the machine, and adjacent to a substantial area of the cylindrical can body in the vicinity of the electrode rollers.

3. A device as in claim 2, wherein the internal surface of the top guides is matched to the external surface of the cylindrical can body.

4. A device as in claim 2, wherein the internal surface of the top guides is embodied with an infinite radius of curvature.

5. A device as in claim 2, wherein the internal surface of the top guides is embodied with a convex profile.

6. A device as in claim 1, wherein the bottom rest of each set of pre-calibration rollers is embodied as a bar extending parallel with the Z-section guide through a distance corresponding at least to that occupied by one of the sets of pre-calibration rollers, of which the top surface exhibits a radius of curvature matching that of the cylindrical body.

7. A device as in claim 1, wherein the precalibration device further comprises:

a pair of guides located one on either sides of the Z-section guide, extending a distance corresponding at least to that occupied by one of the sets of precalibration rollers, rigidly supported by the main structure of the machine, and adjacent to a substantial area of the cylindrical can body in the vicinity of the electrode rollers;

a bottom rest embodied as a bar extending parallel with the Z-section guide through a distance corresponding at least to that occupied by one of the sets of precalibration rollers, of which the top surface exhibits a radius of curvature matching that of the cylindrical can body.

8. A device as in claim 7, wherein the internal surface of the top guides is matched to the external surface of the cylindrical can body.

9. A device as in claim 7, wherein the internal surface of the top guides is embodied with an infinite radius of curvature.

10. A device as in claim 7, wherein the internal surface of the top guides is embodied with a convex profile.

11. A device as in claim 1, wherein the plurality of rollers in contact with the cylindrical can body are cylindrical in embodiment.

12. A device as in claim 1, wherein the plurality of rollers in contact with the cylindrical can body exhibit a convex profile.

13. A device as in claim 1, wherein one or more of the plurality of rollers occupying fixed positions is associated with a clevis support the radially disposed shank of which is supported by the main structure of the machine, and wherein means are provided by which to select and adjust the radial position of the rollers.

14. A device for precalibrating hollow cylindrical can bodies to be seam-welded by continuously operating machines comprising:

an arm, by and along which rolled can bodies are supported and advanced while assuming cylindrical form, their two longitudinal edges approaching one another and overlapping;

a calibration station at which the forming can body assumes prescribed dimensions and is welded by a pair of electrode rollers located internally and externally of the body, respectively;

a precalibration device, located preceding the calibration station along the feed direction followed by the can bodies, consisting in one or more sets of rollers ranged around a circumference coaxial with and of diameter substantially equal to that of the can body, of which at least one set consists in a plurality of rollers occupying fixed positions in relation to the feed direction and exhibiting surfaces with a radius of curvature greater than that of the encompassed cylindrical surface, in such a way that as physically small an area as possible is in rolling frictional contact between each roller and the cylindrical body passing through;

a guide of Z section located above the calibration rollers and extending parallel with the feed direction to terminate immediately prior to the pair of electrode rollers, with which the as yet unwelded edges of the can body are brought into contact;

a pair of guides located one on either side of the Z-section guide, extending a distance corresponding at least to that occupied by one of the sets of precalibration rollers, rigidly supported by the main structure of the machine, and adjacent to a substantial area of the cylindrical can body in the vicinity of the electrode rollers;

a bottom rest embodied as a bar extending parallel with the Z-section guide through a distance corresponding at least to that occupied by one of the sets of precalibration rollers, of which the top surface exhibits a radius of curvature matching that of the cylindrical can body;

wherein at least the rollers of the set coinciding with the top guides and bottom rest occupy fixed positions in relation to the feed direction, and exhibit surfaces with a radius of curvature greater than that of the encompassed cylindrical surface, in such a way that as physically small an area as possible is in rolling frictional contact between each roller and the cylindrical body passing through.

15. A device as in claim 14, wherein the internal surface of the top guides is matched to the external surface of the cylindrical can body.

16. A device as in claim 14, wherein the internal surface of the top guides is embodied with an infinite radius of curvature.

17. A device as in claim 14, wherein the internal surface of the top guides is embodied with a convex profile.

18. A device as in claim 14, wherein the plurality of rollers in contact with the cylindrical can body are cylindrical in embodiment.

19. A device as in claim 14, wherein the plurality of rollers in contact with the cylindrical can body exhibit a convex profile.

20. A device as in claim 14, wherein one or more of the plurality of rollers occupying fixed positions is associated with a clevis support the radially disposed shank of which is supported by the main structure of the machine, and wherein means are provided by which to select and adjust the radial position of the rollers.

* * * * *